US 12,084,382 B2
Sep. 10, 2024

(54) OIL-TREATED PLASTIC FOR CONCRETE

(71) Applicants: Marvin Burton, Glendale, AZ (US); Christian Hoover, Chandler, AZ (US); Elham Fini, Phoenix, AZ (US)

(72) Inventors: Marvin Burton, Glendale, AZ (US); Christian Hoover, Chandler, AZ (US); Elham Fini, Phoenix, AZ (US)

(73) Assignee: Arizona Board of Regents on behalf of Arizona State University, Scottsdale, AZ (US)

( * ) Notice: Subject to any disclaimer, the term of this patent is extended or adjusted under 35 U.S.C. 154(b) by 0 days.

(21) Appl. No.: 18/496,614

(22) Filed: Oct. 27, 2023

(65) Prior Publication Data

US 2024/0059609 A1 Feb. 22, 2024

Related U.S. Application Data

(63) Continuation of application No. 17/484,834, filed on Sep. 24, 2021, now Pat. No. 11,827,564.

(60) Provisional application No. 63/082,745, filed on Sep. 24, 2020.

(51) Int. Cl.
*B09B 3/00* (2022.01)
*B09B 3/21* (2022.01)
*B09B 3/40* (2022.01)
*C04B 18/30* (2006.01)
*C04B 20/10* (2006.01)
*C04B 28/02* (2006.01)

(52) U.S. Cl.
CPC ............. *C04B 18/30* (2013.01); *B09B 3/21* (2022.01); *B09B 3/40* (2022.01); *C04B 20/1025* (2013.01); *C04B 28/02* (2013.01); *Y02W 30/91* (2015.05)

(58) Field of Classification Search
CPC ............. C04B 18/30; B09B 3/40; B09B 3/00
See application file for complete search history.

(56) References Cited

U.S. PATENT DOCUMENTS

| | | | |
|---|---|---|---|
| 5,041,310 A | 8/1991 | Williams et al. | |
| 10,590,038 B1* | 3/2020 | Lee | C04B 40/0039 |
| 11,717,989 B2 | 8/2023 | Fini et al. | |
| 11,761,869 B2 | 9/2023 | Fini et al. | |
| 11,827,564 B2 | 11/2023 | Burton et al. | |
| 2005/0110179 A1* | 5/2005 | Loeffler-Lenz | E04G 11/045 264/33 |
| 2007/0149625 A1* | 6/2007 | Lark | C08J 11/08 521/40 |
| 2011/0219679 A1 | 9/2011 | Budarin et al. | |
| 2012/0059084 A1 | 3/2012 | Brown et al. | |
| 2017/0166722 A1 | 6/2017 | Zhamu et al. | |
| 2021/0002173 A1* | 1/2021 | Lee | C04B 18/22 |
| 2021/0247285 A1 | 8/2021 | Fini et al. | |
| 2022/0089487 A1 | 3/2022 | Burton et al. | |
| 2022/0267211 A1 | 8/2022 | Fini et al. | |
| 2022/0355512 A1* | 11/2022 | Fini | C04B 28/10 |

FOREIGN PATENT DOCUMENTS

| | | | |
|---|---|---|---|
| CN | 106752056 | | 5/2017 |
| CN | 108949282 | | 12/2018 |
| CN | 108949282 A | * | 12/2018 |

OTHER PUBLICATIONS

Buendia et al.. Surface treated polypropylene (PP) fibres for reinforced concrete. Cement and Concrete Research. vol. 54. Dec. 2013. pp. 29-35 (Year: 2013).*
Lam et al. Microwave vacuum pyrolysis of waste plastic and used cooking oil for simultaneous waste reduction and sustainable energy conversion: Recovery of cleaner liquid fuel and techno-economic analysis. Renewable and Sustainable Energy Reviews. vol. 115. Nov. 2019. (Year: 2019).*
[No Author Listed], Steel's Contribution to a Low Carbon Future and Climate resilient Societies: World Steel Position Paper, World Steel Association, 2020, 6 pages.
Albano et al., Influence of content and particle size of waste pet bottles on concrete behavior at different w/c ratios, Waste Manag., 2009, 29:2707-2716.
Amintowlieh et al., Effects of processing variables on polypropylene degradation and long chain branching with UV irradiation, Polym. Degrad. Stab. 104 (2014) 1-10.
Andrew, Global CO 2 emissions from cement production, Earth Syst. Sci. Data, 10:195-217, 2018.
ASTM C293/C293M-10, Standard Test Method for Flexural Strength of Concrete (Using Simple Beam With Center-Point Loading), ASTM International, 2010, 3 pages.
ASTM C39/C39M, Standard Test Method for Compressive Strength of Cylindrical Concrete Specimens, ASTM International, 2018, 8 pages.
Brameshuber, 3—Manufacturing methods for textile-reinforced concrete, Text. Fibre Compos. Civ. Eng., Woodhead Publishing, Triantafillou (Ed.), 2016, pp. 45-59.
Coopamootoo et al., Cement pastes with UV-irradiated polypropylene: Fracture energy and the benefit of adding metakaolin, Constr. Build. Mater. 165 (2018) 303-309.

(Continued)

*Primary Examiner* — Cachet I Proctor
(74) *Attorney, Agent, or Firm* — Fish & Richardson P.C.

(57) ABSTRACT

Treating plastic particles for use in concrete includes combining plastic particles with oil to yield a mixture, heating the mixture to yield a heated mixture, cooling the heated mixture to yield a cooled mixture, and removing excess oil from the cooled mixture to yield oil-treated plastic particles (e.g., oil-treated plastic particles for concrete). In one example, the oil is vegetable oil. The vegetable oil can be soybean oil, corn oil, canola oil, safflower oil, peanut oil, olive oil, grape seed oil, cocoa butter, palm oil, rice bran oil, or a combination thereof. The oil can be waste oil (e.g., waste vegetable oil, such as that recovered from restaurants). The plastic particles can be derived from post-consumer plastic, such as recycled plastic. In one example, the post-consumer plastic includes mixed plastics. A concrete composition can include rocks, sand, cement, and the oil-treated plastic particles.

19 Claims, No Drawings

(56) References Cited

OTHER PUBLICATIONS

Frigione, Recycling of PET bottles as fine aggregate in concrete, Waste Manag. 30 (2010) 1101-1106.
Gallagher et al., Sand and Sustainability: Finding New Solutions for Environmental Governance of Global Sand Resources, Geneva: United Nations Environment Programme, 2019, 57 pages.
Gomathi et al., Surface modification of polypropylene using argon plasma: Statistical optimization of the process variables, Appl. Surf. Sci. 255 (2009) 7590-7600.
Griffith, The Phenomena of Rupture and Flow in Solids, Philos. Trans. R. Soc. Lond. Math. Phys. Eng. Sci. 221 (1921) 163-198.
Gu et al., Use of recycled plastics in concrete: A critical review, Waste Manag. 51 (2016) 19-42.
Hannawi et al., Physical and mechanical properties of mortars containing PET and PC waste aggregates, Waste Manag. 30 (2010) 2312-2320.
Hedir et al., Behavior of Crosslinked Polyethylene Insulation of Medium and High Voltage Power Cables Under UV Radiations, J. Electr. Eng., 17, 2017, 10 pages.
Hoover et al., Cohesive crack, size effect, crack band and work-of-fracture models compared to comprehensive concrete fracture tests, Int. J. Fract. 2014, 187:133-143.
Hoover et al., Comparison of the Hu-Duan Boundary Effect Model with the Size-Shape Effect Law for Quasi-Brittle Fracture Based on New Comprehensive Fracture Tests, J. Eng. Mech. 140 (2014) 480-486.
Hoover et al., Comprehensive Concrete Fracture Tests: Description and Results., Eng. Frac. Mech. 114 (2013) 92-103.
Hoover et al., Comprehensive Concrete Fracture Tests: Size Effects of Types 1 & 2, Crack Length Effect and Postpeak., Eng. Frac. Mech. 110 (2013) 281-289.
Hoover et al., Universal Size-Shape Effect Law Based on Comprehensive Concrete Fracture Tests., J Eng. Mech. 2014, 140:473-479.
Ismail et al., Use of waste plastic in concrete mixture as aggregate replacement, Waste Manag. 2008, 28:2041-2047.
Kanda et al., Interface Property and Apparent Strength of High-Strength Hydrophilic Fiber in Cement Matrix, J. Mater. Civ. Eng. 10 (1998) 5-13.
Kim et al., Material and structural performance evaluation of recycled PET fiber reinforced concrete, Cem. Concr. Compos., 2010, 32:232-240.
Lam et al. "Microwave vacuum pyrolysis of waste plastic and used cooking oil for simultaneous waste reduction and sustainable energy conversion: Recovery of cleaner liquid fuel and techno-economic analysis," Renewable and Sustainable Energy Reviews, 2019, 115:109359, 13 pages.
López-Buendía et al., Surface treated polypropylene (PP) fibres for reinforced concrete, Cem. Concr. Res. 54 (2013) 29-35.
Mahari et al. "Production of value-added liquid fuel via microwave co-pyrolysis of used frying oil and plastic waste," Energy, Aug. 2018, 162: 309-317.
Martínez-Barrera et al., Mechanical properties of polypropylene-fiber reinforced concrete after gamma irradiation, Compos. Part Appl. Sci. Manuf. 42 (2011) 567-572.
Naik et al., Use of post-consumer waste plastics in cement-based composites, Cem. Concr. Res. 26 (1996) 1489-1492.
Nie et al., Atomic force microscopy study of polypropylene surfaces treated by UV and ozone exposure: modification of morphology and adhesion force, Appl. Surf. Sci. 144-145 (1999) 627-632.
Ossola et al., UV modification of tire rubber for use in cementitious composites, Cem. Concr. Compos. 52 (2014) 34-41.
Reed et al., Economic effects of fracture in the United States. Part 1. A synopsis of the Sep. 30, 1982 report to NBS by Battelle Columbus Laboratories, National Measurement Lab., Washington, Dc (USA). Center for Materials Science, 1983, retrieved from URL <https://www.osti.gov/biblio/5995868-economic-effects-fracture-united-states-part-synopsis-september-report-nbs-battelle-columbus-laboratories>, 3 pages (Abstract).
Schaefer et al., (2018). Irradiated recycled plastic as a concrete additive for improved chemo—mechanical properties and lower carbon footprint. Waste Management, 71:426-439.
Wendner et al., Characterization of concrete failure behavior: a comprehensive experimental database for the calibration and validation of concrete models, Mater. Struct. 2015, 48:3603-3626.

* cited by examiner

OIL-TREATED PLASTIC FOR CONCRETE

CROSS-REFERENCE TO RELATED APPLICATIONS

This application is a continuation of U.S. patent application Ser. No. 17/484,834, filed on Sep. 24, 2021, which claims the benefit of U.S. Patent Application No. 63/082,745, filed on Sep. 24, 2020, which are incorporated herein by reference in their entirety.

STATEMENT OF GOVERNMENT INTEREST

This invention was made with government support under 1928795 awarded by the National Science Foundation. The government has certain rights in the invention.

TECHNICAL FIELD

This invention relates to methods for oil-treating plastics for applications in concrete as well as oil-treated plastic and concrete compositions.

BACKGROUND

Concrete is made of sand, rocks, water, and cement. Concrete has many uses, but its production has a large environmental cost. Cement is the ingredient that binds the sand and rock together and is made by crushing and burning limestone. This process has a high $CO_2$ footprint. To cope with the demand generated by rising populations, the annual amount of cement produced is only expected to increase. Concrete can withstand very high compressive loads but its ability to resist tension and bending is low. While concrete is often reinforced with steel bars, the rising costs of steel makes this approach expensive.

Small volume fractions and diameters of plastic particles (PP) have been used to fill pores in concrete. However, simply adding PP to concrete can have adverse effects that result in reduced mechanical performance. Particles (single or agglomerates) that cannot adhere to each other or the hydrating cement effectively increase the porosity in concrete, thereby decreasing the density of the concrete and acting as imperfections that amplify stresses. As such, any mechanical property that depends on average applied stresses, density or low porosity can be adversely affected, such as the compressive and tensile strength, Young's modulus, durability, and crack resistance. Typically, the crack resistance and durability of cementitious materials depends at least in part on their ability to absorb energy. Crack resistance can be quantified by determining the fracture energy ($G_f$). When comparing one material to another, a higher $G_f$ is an indication that the material can absorb more energy and is more resistant to cracking. However, the porosity of concrete reduces the crack resistance and durability.

SUMMARY

This disclosure relates to methods for oil-treating plastics for applications in concrete as well as oil-treated plastic and concrete compositions. Oil-treated plastic for concrete (OTPC), typically includes a mixture of plastics coated with oil.

In a first general aspect, treating plastic particles includes combining the plastic particles with oil to yield a mixture, heating the mixture to yield a heated mixture, cooling the heated mixture to yield a cooled mixture, and removing excess oil from the cooled mixture to yield oil-treated plastic particles.

Implementations of the first general aspect can include one or more of the following features.

The mixture can be allowed to remain at ambient temperature for a length of time (e.g., at least 1 hour or at least 10 hours) before heating. Heating the mixture can include radiating the mixture with microwave radiation.

In some cases, the heated mixture is a first heated mixture, and the method further includes heating the cooled mixture to yield a second heated mixture. When the heated mixture is a first heated mixture, the cooled mixture can be a first cooled mixture, and the method can further include cooling the second heated mixture to yield a second cooled mixture. When the heated mixture is a first heated mixture and the cooled mixture is a first cooled mixture, removing the excess oil from the cooled mixture includes removing the excess oil from the second cooled mixture.

Removing the excess oil from the cooled mixture can include draining the excess oil from the cooled mixture to yield the oil-coated plastic particles. Drying the oil-coated plastic particles can include heating the oil-coated plastic particles.

In a second general aspect, an oil treated plastic composition includes plastic particles and oil. The oil forms a coating on the plastic particles.

In a third general aspect, a concrete composition includes rocks, sand, cement, and an oil-treated plastic composition. The oil-treated plastic composition includes plastic particles coated with oil.

Implementations of the first through third general aspects can include one or more of the following features.

In some cases, the oil is vegetable oil. The vegetable oil can be soybean oil, corn oil, canola oil, safflower oil, peanut oil, olive oil, grape seed oil, cocoa butter, palm oil, rice bran oil, or a combination thereof. The oil can be waste oil (e.g., waste vegetable oil, such as that recovered from restaurants). In certain cases, the plastic particles are derived from post-consumer plastic, such as recycled plastic. In one example, the post-consumer plastic includes mixed plastics. The plastic particles can be prepared by grinding and sieving plastic pellets. The plastic particles typically have a dimension in a range of 1 micron to 100 microns or 30 microns to 50 microns.

The OTPC has various advantages. For example, the OTPC binds with calcium-silicate hydroxide in cement, thereby contributing to concrete load bearing. OTPC also retains moisture in the concrete, thereby improving internal curing. OTPC can be used as a partial replacement for cement, sand, fine aggregates, or a combination thereof in concrete to enhance the tensile strength, ductility, and durability, reduce shrinkage and cracking in the concrete, and reduce the ingress of corrosive chemicals and water. This replacement (e.g., 4-20 wt % of cement in the concrete) reduces the weight of the modified concrete and also reduces costs as well the carbon footprint of carbon construction. OTPC can be incorporated into concrete production processes without disruption to the plant and without on-site and labor intensive installation.

The details of one or more embodiments of the subject matter of this disclosure are set forth in the accompanying drawings and the description. Other features, aspects, and advantages of the subject matter will become apparent from the description, the drawings, and the claims.

DETAILED DESCRIPTION

This disclosure relates to methods for oil-treating plastics for applications in concrete as well as oil-treated plastic and concrete compositions. Oil-treated plastic for concrete (OTPC) typically includes a mixture of plastic particles coated with oil. OTPC is prepared by combining plastic particles with oil to yield a mixture. In some cases, the oil is vegetable oil. The vegetable oil can be soybean oil, corn oil, canola oil, safflower oil, peanut oil, olive oil, grape seed oil, cocoa butter, palm oil, rice bran oil, or a combination thereof. The oil can be waste oil (e.g., waste vegetable oil, such as that recovered from restaurants). In certain cases, the plastic particles are derived from post-consumer plastic, such as recycled plastic. In one example, the post-consumer plastic includes mixed plastics.

Before combining the plastic particles with the oil, the plastic particles can be prepared by reducing the size of plastic pellets or granules. In one example, reducing the size of plastic pellets or granules is achieved by grinding the plastic pellets or granules. A size of the plastic particles is typically in a range of 1 micron to 100 microns (e.g., 10 microns to 90 microns, 20 microns to 70 microns, or 30 microns to 50 microns).

The mixture can include a weight ratio of plastic particles to oil of 10:1 to 1:10. In one example, a weight ratio of plastic particles to oil is about 1:1. The mixture can be allowed to rest at ambient temperature for a length of time (e.g., at least 1 hour or at least 10 hours). As used herein, "ambient" generally refers to the air temperature of the immediate surroundings where the OTPC is prepared. The immediate surroundings can be indoors or outdoors (e.g., 15° C. to 40° C.). The mixture is heated (e.g., to a temperature in a range of 35° C. to 100° C., or 50° C. to 80° C.) to yield a heated mixture. The mixture can be heated in a variety of methods. In one example, the mixture is heated with microwave radiation. The heated mixture is cooled to yield a cooled mixture. In certain cases, the cooled mixture is reheated. The cooled mixture can be heated in a variety of methods. In one example, the cooled mixture is reheated with microwave radiation. The cooled mixture can be allowed to cool again.

Excess oil is removed from the cooled mixture to yield oil-coated plastic particles. Removing the excess oil can be achieved by draining the oil or any other method suitable for separating the plastic particles from excess oil. The oil-coated plastic particles are dried to yield oil-treated plastic particles. Drying the oil-coated plastic particles typically includes heating the oil-coated plastic particles (e.g., in an oven). The oil-coated plastic particles can be heated to yield the oil-treated plastic particles.

OTPC includes plastic particles and oil as described herein. The oil forms a coating on the plastic particles.

A concrete composition modified with OTPC typically includes rocks, sand, cement, and OTPC as described herein. The OTPC can be used replace at least some of the concrete or some of the sand in a conventional concrete composition.

Example

Plastic granules were prepared by grinding and sieving plastic particles. Particles with a maximum dimension in a range of 30-50 microns were separated and combined in a 1:1 mass ratio with waste soybean oil and mixed thoroughly. This preconditioned mixture was allowed to sit at room temperature for 12 hours, and then irradiated for 4 minutes with microwave radiation. The heated mixture was stirred to ensure proper heat distribution, then allowed to cool for 4 minutes. The cooled mixture was then irradiated with microwave radiation for an additional 4 minutes, stirred to ensure proper heat distribution, and allowed to cool for 20 minutes. After cooling, excess oil was drained, and samples were dried in an oven for 15 minutes at 200° F. The dried samples were used as a partial replacement for cement in a concrete composition.

Although this disclosure contains many specific embodiment details, these should not be construed as limitations on the scope of the subject matter or on the scope of what may be claimed, but rather as descriptions of features that may be specific to particular embodiments. Certain features that are described in this disclosure in the context of separate embodiments can also be implemented, in combination, in a single embodiment. Conversely, various features that are described in the context of a single embodiment can also be implemented in multiple embodiments, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular embodiments of the subject matter have been described. Other embodiments, alterations, and permutations of the described embodiments are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results.

Accordingly, the previously described example embodiments do not define or constrain this disclosure. Other changes, substitutions, and alterations are also possible without departing from the spirit and scope of this disclosure.

What is claimed is:

1. A method of forming concrete containing oil-treated plastic particles, the method comprising:
   combining plastic particles with oil to yield a mixture;
   heating the mixture to yield a heated mixture;
   cooling the heated mixture to yield a cooled mixture;
   removing excess oil from the cooled mixture to yield oil-treated plastic particles;
   adding the oil-treated plastic particles to rocks, sand, and cement; and
   binding the oil-treated plastic particles to calcium-silicate hydroxide in the cement to yield the concrete containing oil-treated plastic particles.

2. The method of claim 1, wherein the plastic particles are formed by grinding and sieving plastic pellets.

3. The method of claim 1, wherein the plastic particles have a dimension in a range of 1 micron to 100 microns.

4. The method of claim 3, wherein the plastic particles have a dimension in a range of 30 microns to 50 microns.

5. The method of claim 1, wherein the mixture is allowed to remain at ambient temperature for a length of time before heating the mixture.

6. The method of claim 5, wherein the mixture is allowed to remain at ambient temperature for at least 10 hours before heating the mixture.

7. The method of claim 1, wherein heating the mixture comprises irradiating the mixture with microwave radiation.

8. The method of claim 1, wherein the heated mixture is a first heated mixture, and further comprising heating the cooled mixture to yield a second heated mixture.

9. The method of claim 8, wherein the cooled mixture is a first cooled mixture, and further comprising cooling the second heated mixture to yield a second cooled mixture.

10. The method of claim 9, wherein removing the excess oil from the cooled mixture comprises removing the excess oil from the second cooled mixture.

11. The method of claim 1, wherein removing excess oil from the cooled mixture comprises draining the excess oil from the cooled mixture to yield the oil-coated plastic particles.

12. The method of claim 11, further comprising drying the oil-coated plastic particles to yield the oil-treated plastic particles.

13. The method of claim 12, wherein drying the oil-coated plastic particles comprises heating the oil-coated plastic particles.

14. The method of claim 1, wherein the plastic particles are derived from post-consumer plastic.

15. The method of claim 14, wherein the post-consumer plastic comprises mixed plastics.

16. The method of claim 1, wherein the oil comprises vegetable oil.

17. The method of claim 16, wherein the vegetable oil comprises waste vegetable oil.

18. The method of claim 16, wherein the vegetable oil comprises soybean oil, corn oil, canola oil, safflower oil, peanut oil, olive oil, grape seed oil, cocoa butter, palm oil, rice bran oil, or a combination thereof.

19. The method of claim 1, wherein the oil-treated plastic particles make up about 4-20 wt % of the cement in the concrete.

* * * * *